United States Patent [19]
Yoshida et al.

[11] 3,895,770
[45] July 22, 1975

[54] WEIGHT BALANCING MECHANISM FOR USE IN PRECISION ELEVATING AND LOWERING MEANS

[75] Inventors: Isamu Yoshida, Kokubunji; Toshimi Hayasaka, Hino, both of Japan

[73] Assignee: Olympus Optical Co., Ltd., Tokyo, Japan

[22] Filed: July 16, 1973

[21] Appl. No.: 379,316

[30] Foreign Application Priority Data
July 15, 1972  Japan.............................. 47-71138

[52] U.S. Cl................................... 248/123; 350/86
[51] Int. Cl.............................................. G12b 3/00
[58] Field of Search ........... 248/123, 162, 297, 329, 248/330, 334; 350/86

[56] References Cited
UNITED STATES PATENTS

| | | | |
|---|---|---|---|
| 2,168,209 | 8/1939 | Haupt.................. | 248/123 |
| 2,502,510 | 4/1950 | Daugert................ | 248/123 |
| 2,901,202 | 8/1959 | Stava et al. ........... | 248/123 |
| 3,214,119 | 10/1965 | Jonsson et al. ........ | 248/123 |
| 3,575,368 | 4/1971 | Thomas et al. ........ | 248/123 |

FOREIGN PATENTS OR APPLICATIONS
960,846   6/1964   United Kingdom................... 350/86

Primary Examiner—Roy D. Frazier
Assistant Examiner—Robert W. Gibson, Jr.
Attorney, Agent, or Firm—Cushman, Darby & Cushman

[57] ABSTRACT

A weight balancing mechanism for making precision ascending and descending movements of the stage unit of a microscope, which mechanism comprising a spring force adjusting means provided on a coil spring which, in turn, dependingly supports said stage unit, whereby this stage unit can be held always in balance of weight regardless of any change in the total weight of this unit which may take place as required.

1 Claim, 1 Drawing Figure

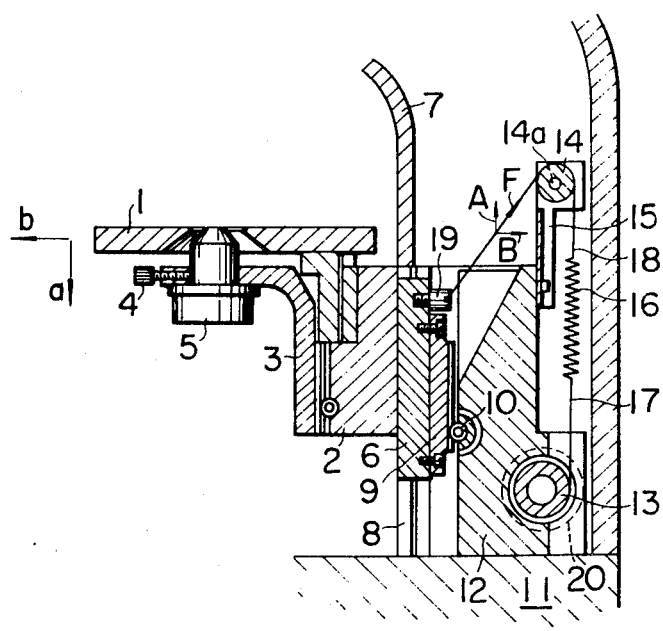

WEIGHT BALANCING MECHANISM FOR USE IN PRECISION ELEVATING AND LOWERING MEANS

BACKGROUND OF THE INVENTION a. Field of the Invention

The present invention relates to an apparatus for precision elevating and lowering of the position of an object, for use in various kinds of precision measuring devices, and more particularly it pertains to a weight balancing mechanism used in an object-carrying stage unit elevating and lowering means of a microscope.

b. Description of the Prior Art

Recently, the methods of making measurements, determinations, examinations and tests by the use of precision measuring and examining apparatuses such as microscopes and the like have become extensively diversified in type as well as in purpose. For these reasons, it often becomes necessary to replace a certain stage unit by a different one and also to use various kinds of attachments in microscopic examinations and measurements. Accordingly, for example, whenever a stage unit, a condenser and the like of a microscope are to be replaced by different ones during the use of the microscope, there will accordingly develop a change in the weight applied to the stage unit elevating and lowering means at each time of such replacement. When large and heavy stage and condenser are attached, there will be an increase in the weight applied to said elevating and lowering means. This increase in weight, in turn, will cause drawbacks such as warping and squeaking to develop in, for example, the guide mechanism, adversely affecting the elevating and lowering mechanism. In order to eliminate these drawbacks, it has been widely practiced in the past to effect the balancing of the weight applied to the stage unit by pulling it upwardly by a spring mechanism such as a coil spring. However, even when such a weight balancing mechanism is employed, there occurs the inconvenience that, in case such attachments as a universal stage in a polarized microscope and a phase contrast means are secured to the stage unit and the condenser, or in case a very heavy high temperature furnace or the like is attached to the stage unit or in case the stage unit and the condenser employed are particularly heavy, there will be applied an excessively great force to the stage unit elevating and lowering means and accordingly said weight balancing mechanism employed will fail to establish sufficient balancing of the weight applied thereto. As a result, it becomes actually impossible to secure the precision with which the optimum focus is to be set. On the other hand, if the weight balancing mechanism is fixedly adjusted beforehand so as to hold the force applied to the elevating and lowering means balanced in case the load applied to the stage unit is great and in case a particularly heavy stage unit is employed, there will occur the imbalance of the weight applied to the stage unit elevating and lowering means whenever a relatively light stage unit is used or whenever such heavy attachments as mentioned above are not provided at all. Thus, the elevating and lowering means will be subjected to unusual stresses.

The aforesaid problems have to be solved not only in the stage unit elevating and lowering means of a microscope alone, but also in those elevating and lowering means employed in various kinds of precision measuring and examining apparatuses or like apparatuses wherein it is required particularly to make precision elevation and descension of objects and parts whose weights are to be altered significantly — so that there can be held a good balance always, conforming to any change in weight.

SUMMARY OF THE INVENTION

It is, therefore, the object of the present invention to provide a weight balancing mechanism for use in a precision elevating and lowering apparatus, which mechanism is capable of always holding a good balance of the weight of an object and also capable of effecting smooth and precision elevation and descension of this object even when this weight of the object which is to be ascended and descended in precision is altered substantially.

The weight balancing mechanism for use in the precision elevating and lowering apparatus of the present invention is arranged to keep balance of the weight of the object requiring to be elevated and lowered in precision by the provision of a spring force adjusting mechanism secured to one end of a coil spring which, in turn, is fixed at its other end to said object for supporting it dependingly, whereby the spring force can be adjusted in accordance with the weight of this object per se.

The present invention will hereafter be described in further detail in a preferred embodiment by referring to the drawing which is shown simply by way of example.

BRIEF DESCRIPTION OF THE DRAWING

The drawing is a sectional view, showing the instance in which the weight balancing mechanism of the present invention is applied to the stage unit elevating and lowering apparatus of a microscope.

DESCRIPTION OF THE PREFERRED EMBODIMENT

In the drawing, reference numeral 1 represents a stage unit of a microscope which, as will be discussed later, is detachably secured to a block 2 — which is capable of moving upwardly and downwardly relative to the arm of the microscope — in such a manner that it can be replaced by a different stage unit whenever required. Numeral 3 represents a condenser holding member secured to said block 2 for being adjustable of its vertical position by a known mechanism such as a rack and a pinion. Numeral 5 represents a condenser detachably secured to said condenser holding member 3 by means of a screw 4. Numeral 6 represents a plate-like member fixed to said block 2 and is allowed to move upwardly and downwardly along a guide member 8 fixed to an arm 7. Numeral 9 represents a rack fixed to said plate-like member 6. Numeral 10 represents a pinion meshing with said rack 9 and held rotatably relative to a strut 12 which, in turn, is fixed to a base 11. Though not shown, a handle for making the upward and downward movements of the stage unit 1 is fixed to the shaft of said pinion 10. By the rotation of this handle, this pinion 10 is rotated to cause the upward and downward movements of the rack 9 which meshed with this pinion 10, thereby causing, via the plate-like member 6 and the block 2, the stage unit 1 to move vertically jointly with the condenser 5. Numeral 13 represents a cylinder rotatably provided on the strut 12. Numeral 14 represents a roller rotatably secured about a shaft 14a provided on a bracket 15 which, in turn, is fixed to the strut 12. Numeral 16 represents a coil spring. Numeral 17 represents a wire having its one end coupled to the coil spring 16 and its other end fixed to the cylinder 13 after being wound several turns around it. Numeral 18 represents another wire having its one end coupled in the same way to the coil spring 16 and its other end held by a pin 19 which is fixed to the plate-like member 6 after being applied onto the roller 14. Numeral 20 represents a handle provided on the cylinder 13 to rotate the cylinder 13 thereby and is arranged so that this handle can be clamped in any desired position by a known clamping mechanism not shown.

In one exemplary embodiment of the present invention described above, it should be understood that the force applied to the stage unit 1 is expressed by the sum of the force which acts downwardly as shown by the arrow $a$ and the force which acts leftwardly horizontally as shown by the arrow $b$. On the other hand, a tension which acts obliquely upwardly as shown by the arrow F is applied, via the wire 18 through the coil spring 16, to the plate-like member 6. By arranging so that the components A and B of the tension F exerted by the coil spring 16 are offset by the forces $a$ and $b$, respectively, which are applied to the stage unit 1, said tension and said forces will be held in balance so that the stage unit 1 will be allowed to make satisfactory vertical movements with no difficulty whatsoever. It should be understood that, with the aforesaid arrangement, the tension F exerted by the coil spring 16 can be varied by rotating the handle 20. Therefore, even when there arises a change in the forces $a$ and $b$ applied to the stage unit 1, it is only necessary to adjust, in accordance with the change in said forces, this tension F which is caused by the coil spring 16. For example, in case a heavy high temperature furnace is mounted on the stage unit 1, there will be an increase in the forces $a$ and $b$. In such an instance, the handle 20 is operated to rotate the cylinder 13 clockwise. Whereby, the coil spring 16 will become tensioned so that the tension F increases. The components A and B of this increased tension F will be used to offset the increased forces $a$ and $b$ respectively. Contrariwise, in case the stage unit 1 and the condenser 5 are replaced by those having a lighter weight and in case, accordingly, there arises a decrease in the forces $a$ and $b$, the handle 20 is operated to rotate the cylinder 13 counter-clockwise, thereby loosening the coil spring 16 and decreasing the tension F. This tension F is adjusted until the components A and B of this decreased tension F exactly offset the forces $a$ and $b$, respectively.

As stated above, according to the present invention, the tension of the coil spring 16 is adjusted by operating the handle 20 in accordance with the weight of those parts which are adapted to be moved vertically, whereby good balance of weights can be maintained and thus it is possible to make upward and downward movements of the stage unit in precision.

In an actual apparatus, both the handle 20 and the arm 7 are provided with several indicating symbols conforming to a range of weight. By doing so, the user will be required only to turn this handle 20 to align the indicating symbols, so that he can very easily adjust the balance of weight exactly to the optimum point and thus the purpose of use can be attained satisfactorily.

It is needless to say that the present invention is not limited to the above-mentioned example and that various modifications can be conceived. For instance, in the stage unit elevating and lowering apparatus of a microscope equipped with both coarse and fine adjustment mechanisms, it is possible to furnish each of said coarse and fine mechanism with a weight balancing mechanism of the present invention. Furthermore, it will be apparent that the weight balancing mechanism of the present invention can be applied not only to the stage unit elevating and lowering apparatus of a microscope as shown in the exemplary embodiment, but also to the elevating and lowering devices of various kinds of measuring and examining apparatuses or like apparatuses.

What is claimed is:

1. A weight balancing mechanism for use in precision elevating and lowering means, comprising object means having a variable weight, elevating and lowering means coupled to said object means at a location which is laterally displaced from the center of gravity of the object for precisely elevating and lowering said object means in a vertical direction, a tension member including a spring portion fixed at one end to said object means and fixed at its other end to a mounting mechanism remote from said object means said tension member extending at an oblique angle from said object means with respect to the vertical direction in the sense which causes the application of both vertical and horizontal force component to said object means in opposition to the weight and weight moment of the object means about said elevating and lowering means, respectively, said mounting mechanism including manual adjustment means for altering the tension upon said object means and said mechanism to thereby selectively increase or decrease the force exerted on said object means in corresponding opposition to variations in the weight of said object means;

said tension member including an elongated flexible portion extending from one end of the spring portion and wherein said mounting mechanism comprises a cylindrical member about which said elongated flexible portion is wrapped, with said manual adjustment means comprising means to manually rotate the cylinder to wrap more or less of said elongated flexible portion about the cylinder.

* * * * *